United States Patent
Suzuki et al.

[19]

[11] Patent Number: 6,126,264
[45] Date of Patent: *Oct. 3, 2000

[54] APPARATUS AND METHOD FOR RECORDING COLOR IMAGES WITH INCREASED IMAGE UNIFORMITY

[75] Inventors: Akio Suzuki; Hisashi Fukushima, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/254,435

[22] Filed: Jun. 6, 1994

Related U.S. Application Data

[63] Continuation of application No. 08/034,172, Mar. 18, 1993, abandoned, which is a continuation of application No. 07/587,786, Sep. 25, 1990, abandoned.

[30] Foreign Application Priority Data

Sep. 28, 1989 [JP] Japan ..................................... 1-254329

[51] Int. Cl.[7] .................................................. B41J 29/43
[52] U.S. Cl. ................................................. 347/19; 347/43
[58] Field of Search ................................. 347/43, 14, 15, 347/19, 23

[56] References Cited

U.S. PATENT DOCUMENTS

| | | | |
|---|---|---|---|
| 4,328,500 | 5/1982 | Weber et al. | 347/14 |
| 4,403,874 | 9/1983 | Payne et al. | 400/124 |
| 4,468,112 | 8/1984 | Suzuki et al. | 355/14 D |
| 4,595,948 | 6/1986 | Itoh et al. | 358/75 |
| 4,630,069 | 12/1986 | Erlichman | 346/76 PH |
| 4,675,696 | 6/1987 | Suzuki | 347/19 |
| 4,682,216 | 7/1987 | Sasaki et al. | 358/79 |
| 4,814,886 | 3/1989 | Kuge et al. | 358/293 |
| 4,827,279 | 5/1989 | Lubinsky et al. | 346/1.1 |
| 4,829,323 | 5/1989 | Suzuki et al. | 346/140 R |
| 4,853,768 | 8/1989 | Suzuki et al. | 358/80 |
| 4,855,765 | 8/1989 | Suzuki et al. | 346/154 |
| 4,855,766 | 8/1989 | Suzuki | 346/160 |
| 4,882,621 | 11/1989 | Suzuki et al. | 358/80 |
| 4,929,978 | 5/1990 | Kanamori et al. | 355/38 |
| 4,959,669 | 9/1990 | Haneda et al. | 346/157 |
| 4,985,759 | 1/1991 | Ito | 358/79 |
| 5,004,928 | 4/1991 | Suzuki et al. | 250/559 |
| 5,038,208 | 8/1991 | Ichikawa et al. | 358/75 IJ |
| 5,343,231 | 8/1994 | Suzuki | 347/14 |

FOREIGN PATENT DOCUMENTS

| | | |
|---|---|---|
| 0011722 | 6/1980 | European Pat. Off. . |
| 0317268 | 5/1989 | European Pat. Off. . |
| 57-41967 | 3/1982 | Japan ...... 347/19 |
| 159661 | 10/1982 | Japan ...... 347/15 |
| 63-303370 | 4/1989 | Japan . |
| 1-110154 | 7/1989 | Japan . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

A color image recording apparatus that detects a non-uniformity in recorded pixels of a recorded color image. In the apparatus, a recording device has a plurality of recording units, each of the recording units having a plurality of nozzles which record different pixels, respectively. The plural recording units corresponding to a plurality of different color materials, respectively. The apparatus causes the nozzles of the recording device to form a color image including a plurality of recorded pixels, using a mixture of the plural colors, each of which has a constant density. A detector detects a density non-uniformity in the recorded pixels of the thus recorded color image including a plurality of recorded pixels and has an associated output. A controller controls of the nozzles in accordance with the density non-uniformity detected by the detector.

8 Claims, 6 Drawing Sheets

APPARATUS AND METHOD FOR RECORDING COLOR IMAGES WITH INCREASED IMAGE UNIFORMITY

This application is a continuation of application Ser. No. 08/034,172 filed Mar. 18, 1993, now abandoned and which is a continuation of application Ser. No. 07/587,786 filed Sep. 25, 1990, now abandoned.

FIELD OF THE INVENTION AND RELATED ART

The present invention relates to a color image recording method and apparatus, more particularly to such a method and apparatus for forming a color image using plural recording heads.

In a known apparatus, an image is read and is converted to image data which are in turn converted to digital signals. The digital signals are processed, and an image is recorded by recording heads using the processed data. In such an apparatus, the densities of the record is not necessarily uniform among the plural recording elements due to recording property variations attributable to the recording head manufacturing process and attributable to the recording head constituting materials. This non-uniformity results in density non-uniformity of the recorded image. In order to avoid the problem, it has been proposed that a test run be performed before the recording operation begins to determine the output properties for the respective recording elements, and the output properties are stored as data. In accordance with the stored data, the input image data is corrected so as to compensate for the above described density non-uniformity. U.S. patent application Ser. Nos. 271,299 and 480,041, assigned to the assignee of this application, for example, propose methods of the correction.

However, it is not possible to completely remove the non-uniformity by the correction, and it is unavoidable that some non-uniformity remains. Generally, if the correction is made to such an extent that the non-uniformity is inconspicuous, it is practically sufficient.

However, even if the correction is made to the above extent for a single color, the non-uniformity may be very conspicuous when a color image is formed using two different color heads.

Referring first to FIGS. 3 and 4, this will be described more in detail. In FIG. 3, the ordinate represents a density, and the abscissa represents positions of the individual heads in a multi-head recording apparatus. Even if the density non-uniformity of each of the heads is so small as to be inconspicuous, the density non-uniformity for the complete image is amplified and becomes very conspicuous when the patterns of the respective color image components have the same phase, as shown in FIG. 3, which causes the density non-uniformity to be superposed to each other.

On the contrary, when the patterns have the opposite phases as shown in FIG. 4, the magenta component is stronger in a portion A, and the cyan component is stronger in a portion B. Thus, the color non-uniformity or imbalance is produced and is very conspicuous. Thus, when a color image is produced using two or more color heads, the density non-uniformity may be strengthened depending on the non-uniformity patterns of the respective heads, with the result of non-uniformity in the color. It is possible that the resultant non-uniformity is not expected from the non-uniformity pattern in a single color recording.

SUMMARY OF THE INVENTION

Accordingly, it is a principal object of the present invention to provide a color image recording method or apparatus wherein the density non-uniformity is suppressed.

It is another object of the present invention to provide a color image recording apparatus or method wherein the density non-uniformity of mixed color recording is corrected.

It is a further object of the present invention to provide a color image recording method and apparatus wherein the color reproducibility is improved.

According to an embodiment of the present invention, there is provided a color image recording apparatus comprising recording means including plural recording heads for different colors to record a color image, detecting means for forming a mixed color image using at least two recording heads, and for detecting a density non-uniformity of the image, and control means for controlling said recording means in accordance with an output of the detecting means.

Still another embodiment of this invention pertains to a color image recording apparatus which includes a recording means for recording having a plural recording units each having plural recording elements arranged in a predetermined direction, the recording means recording a color image using different colors, means for causing the recording elements of the recording means to form the color image including plural recorded pixels arranged in the predetermined direction, using a mixture of the colors each of which has a constant density, and detecting means for detecting a density non-uniformity, in the predetermined direction, of the thus-recorded color image including plural recorded pixels and having an associated output. A control means controls the recording means in accordance with the output of the detecting means.

An additional aspect of this invention concerns a color image recording method, which involves forming a color image with a mixture of different colors provided by plural respective recording units each having plural recording elements arranged in a predetermined direction and corresponding to the different colors, each of which has a constant density, the said recording elements forming an image having plural recorded pixels arranged in the predetermined direction. The method also involves detecting a color non-uniformity, in the predetermined direction, of the thus-recorded color image including plural recorded pixels formed by the recording elements, and controlling the plural recording elements in accordance with the color non-uniformity detected in the detecting step.

Yet another aspect of this invention relates to a color image recording apparatus which includes plural recording heads for recording different colors, at least one of the recording heads having plural recording units each having recording elements arranged in a predetermined direction, and means for causing the recording elements to form a color image including a plurality of recorded pixels arranged in the predetermined direction, so that the image is formed with a mixture of the colors each of which has a constant density. A detecting means detects a density non- uniformity, in the predetermined direction, of the color image having the pixels recorded with the mixture of plural colors.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
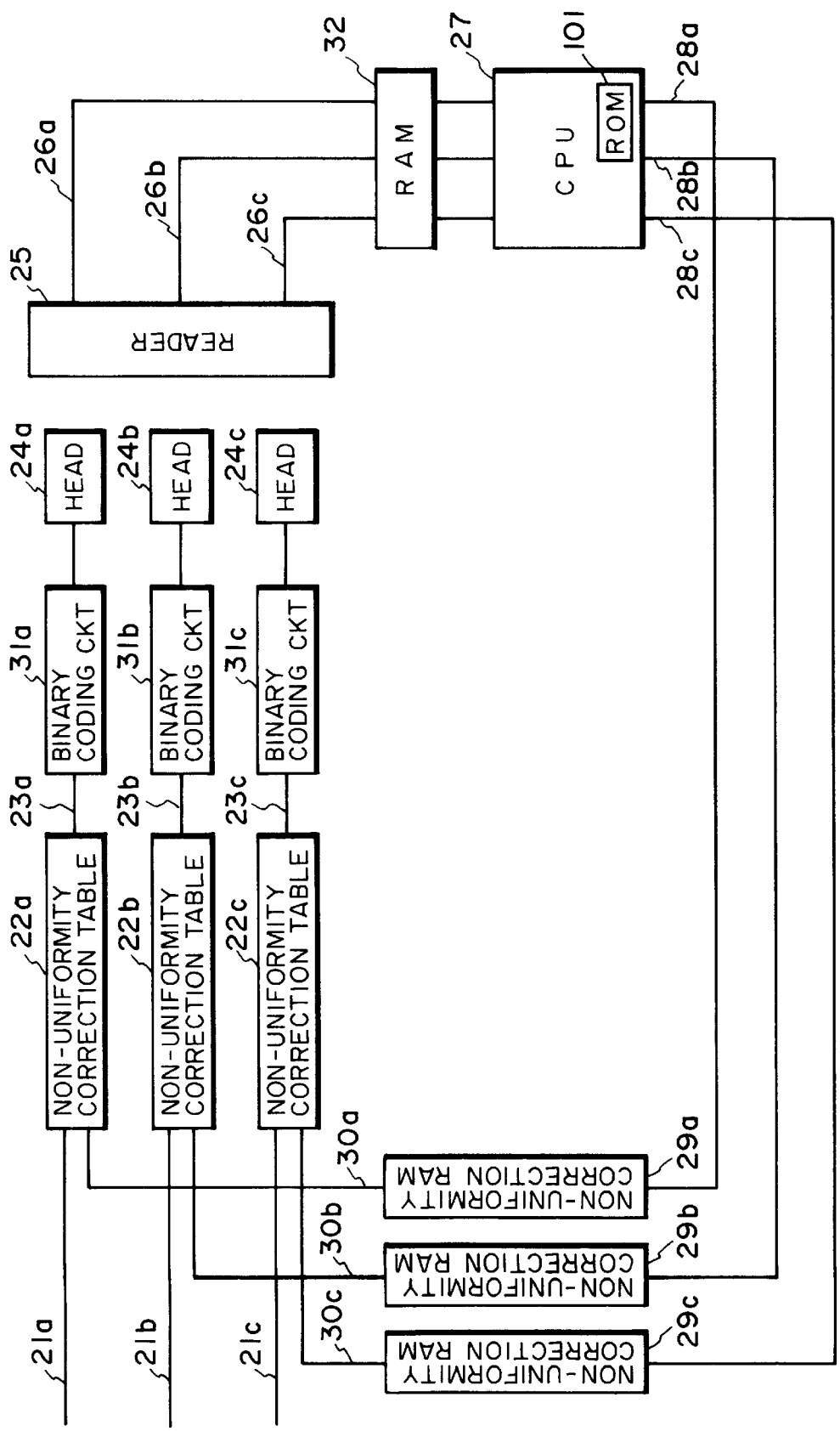
FIG. 1 is a block diagram for an image recording apparatus according to a first embodiment of the present invention.

Referring to FIG. 1, there is shown a block diagram used in the recording apparatus according to a first embodiment of the present invention. In FIG. 1, references 21a, 21b and 21c designate image signals for cyan color, magenta color and yellow color, respectively. The apparatus includes correction tables 22a, 22b and 22c for the respective colors. The color are signals after the correction for the respective colors indicated by references 23a, 23b and 23c. The apparatus comprises a binary coding circuit 31a, 31b and 31c, ink jet recording heads 24a, 24b and 24c each having 256 nozzles and a reader 25 provided with red (R), green (G) and blue (B) filters. The signals produced by the reader 25 are indicated by references 26a, 26b and 26c, which are read through R, G and B filters, respectively. The apparatus further comprises a RAM 32 for temporarily storing the R, G and B signals and a CPU for processing correction data on the basis of the R, G and B signals. The correction data for the cyan, magenta and yellow colors produced by the CPU 27 are indicated by references 28a, 28b and 28c. The apparatus also includes color correction RAMS 29a, 29b and 29c for the respective colors. The non-uniformity correction signals for the respective colors are depicted by references 30a, 30b and 30c.

The input image signals 21a, 21b and 21c are processed according to the non-uniformity correcting tables 22a, 22b and 22c so as to compensate for the non-uniformities peculiar to the respective recording heads 24a, 24b and 24c.

Figure 5:
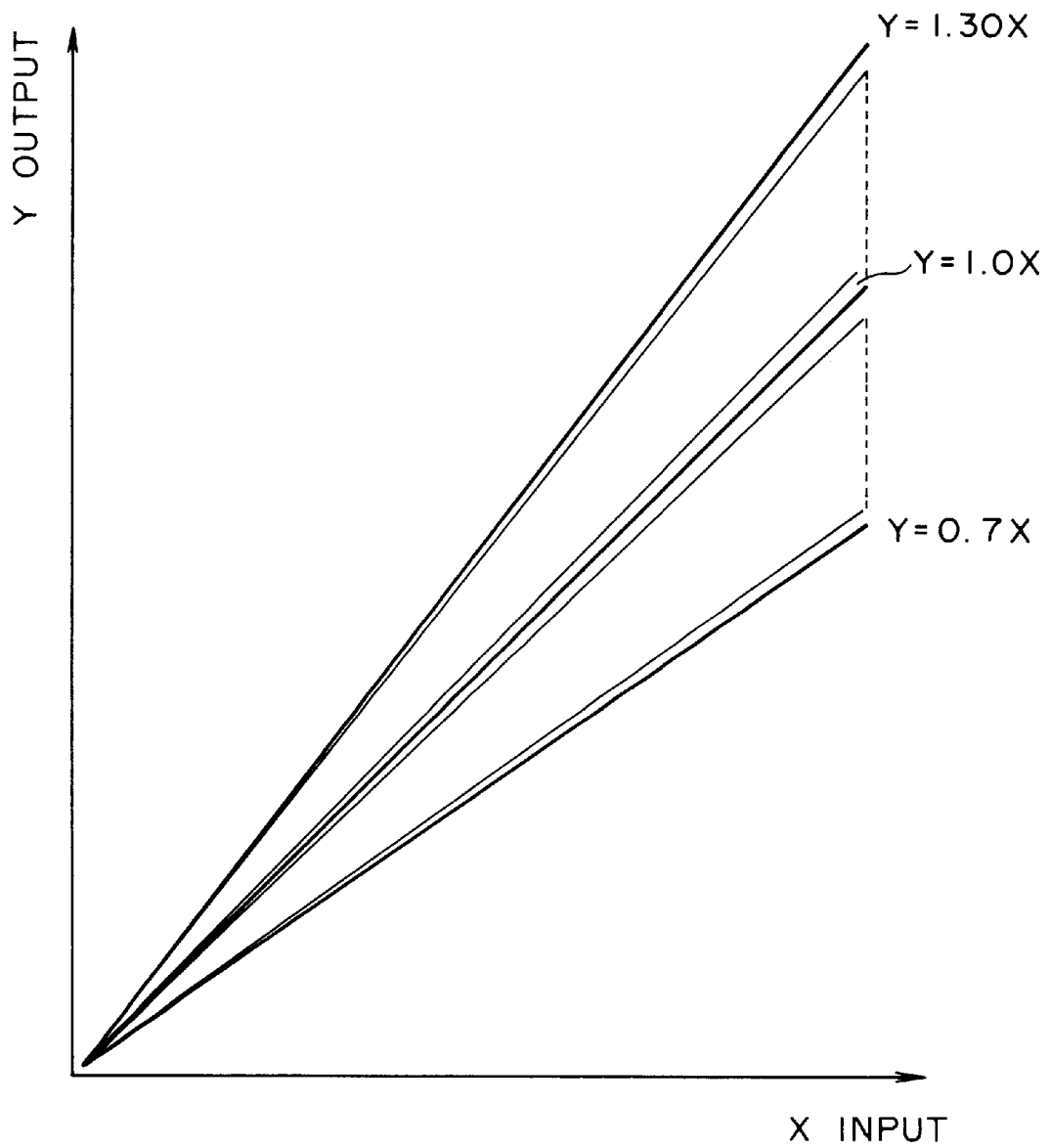
FIG. 5 shows correcting lines in an embodiment of the present invention.

As shown in FIG. 5, the non-uniformity correction table contains 61 correcting curves representing (Y=0.70X), (Y=1.30X) with through increments that are 0.01 of the slope, where X is the input, and Y is the corrected output. A correction curve is selected on the basis of non-uniformity correcting signals 30a, 30b and 30c. When a picture element signal is applied to a nozzle having the property of large dot diameter, the correcting curve with small slope is selected, whereas when it is the nozzle having the property of small dot diameter, a large slope correcting curve is selected, by which the image signal is corrected.

The non-uniformity correction tables 22a, 22b and 22c store selection signals for the correction curves required for correcting the non-uniformities of the respective recording heads. More particularly, the correcting signals from the 61 lines are stored for 256 nozzles (the recording heads 24a, 24b and 24c have 256 nozzles), in this embodiment. In response to input signals, non-uniformity correcting signals 30a, 30b and 30c are produced. After the correction on the basis of the selected curves, the corrected image signals 23a, 23b and 23c are converted to binary signals using the binary coding circuits 31a, 31b and 31c using dither processing, an error dispersing process or the like. The multi-nozzle ink jet recording heads 24a, 24b and 24c are driven by the binary signals thus provided. In this manner, the uniform images can be provided.

Figure 7:
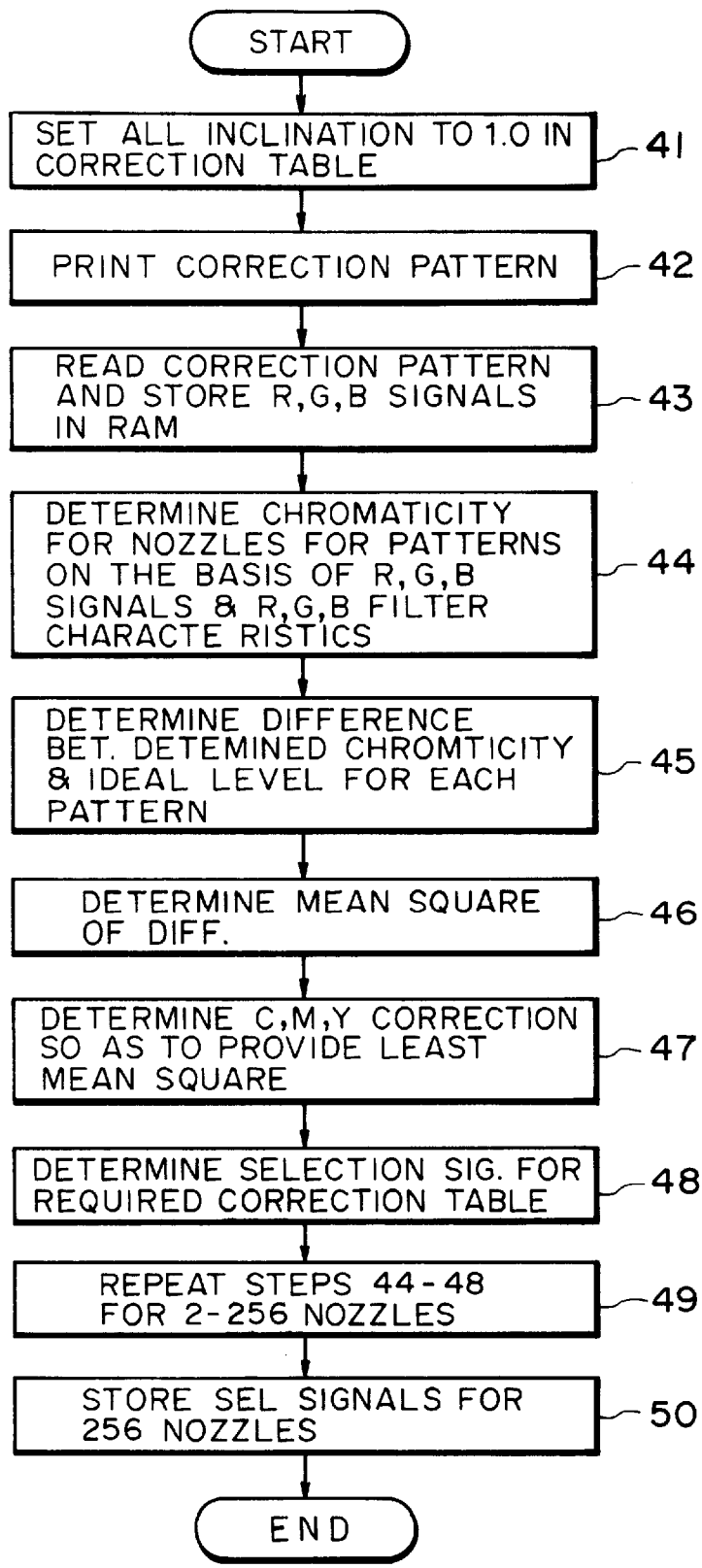
FIG. 7 illustrates method of producing non-uniformity correction data in a first embodiment of the present invention.

Referring to FIG. 7, the method of producing correction data will be described. First, in response to an unshown control signal, a curve of slope 1.0 is selected from each of the non-uniformity correcting tables 22a, 22b and 22c, that is, the non-correcting operation mode is established (step 41, FIG. 7). Then, a correction pattern is provided from an unshown signal source, and a correction pattern is printed or recorded by the recording heads 24a, 24b and 24c (step 42). As for the correcting pattern, any of a number of types are usable, and one skilled in the art can properly select such pattern in accordance with the spirit of the present invention. In this embodiment, a uniform pattern in six colors is used wherein the pattern is made of cyan color, magenta color, yellow color (single colors), a red color, a green color and a blue color (mixtures of two colors).

The output pattern is read by the reader 25 (FIG. 1) and the read signals 26a, 26b and 26c for three colors read by the reader 25 are once stored in the RAM 32 (step 43). The CCD of a reader 25 has the reading density which is the same as the recording density of the recording heads. In this embodiment, it is 400 dpi. In this embodiment, the number of picture elements of the CCD is larger than the number of the nozzles 256 of the recording head. Therefore, by the reading operation, three color separated signals of the non-uniformity pattern of the six color pattern are determined.

Figure 6:
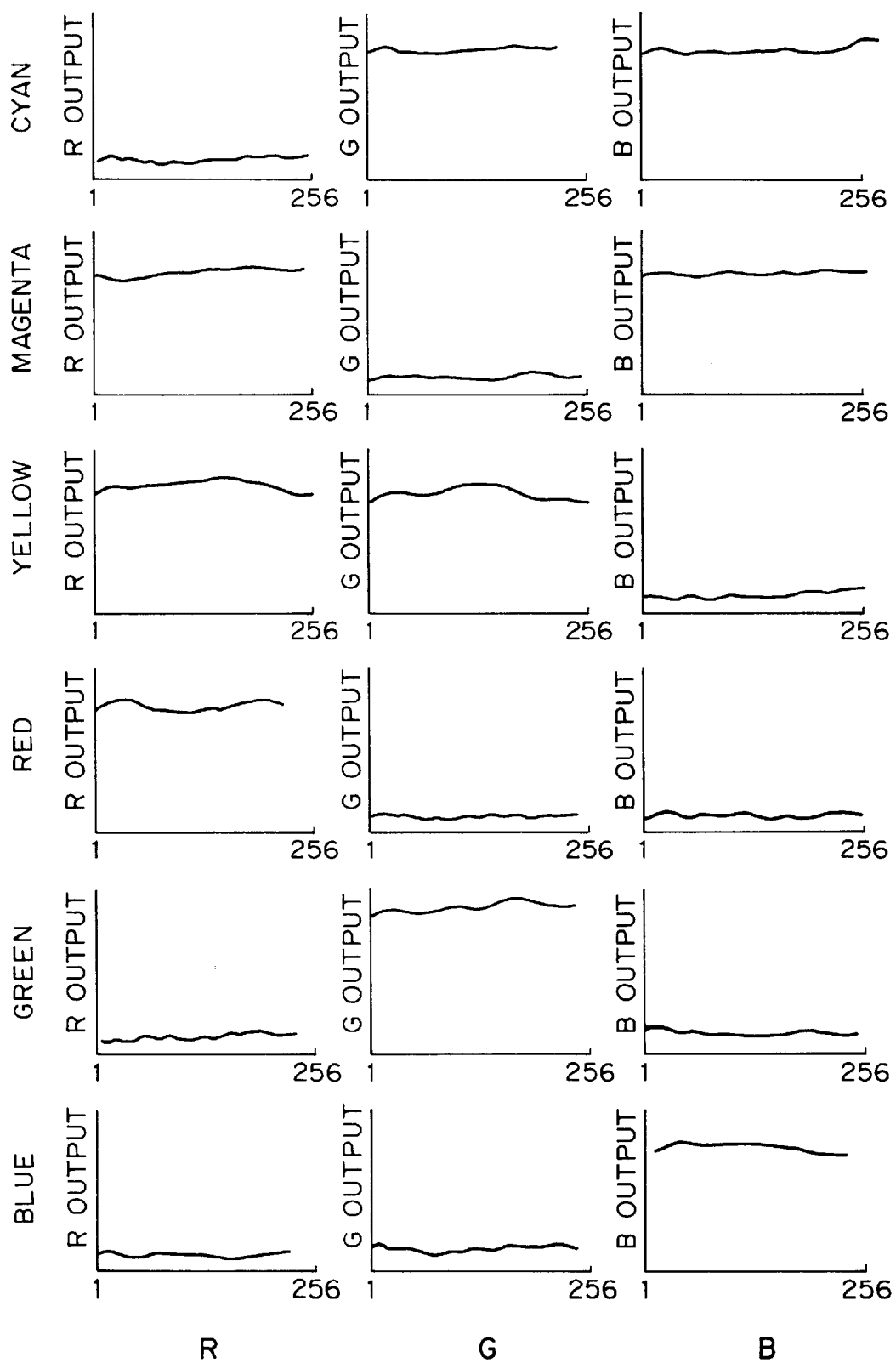
FIG. 6 illustrates non-uniformity pattern read signal.

FIG. 6 is the three-color-separated signals provided in this manner. For the cyan pattern, the picture element printed by the first nozzle is read, and an R-reading output is Rc1, G-reading output is Gc1, B-reading output is Bc1. When the cyan pattern is read, Rc1–Rc256, Gc1–Gc256, Bc1–Bc256 are obtained. Similarly, when the magenta pattern is read, Rm1–Rm246, Gm1–Gm256, Bm1–Bm256 are obtained. When the yellow pattern is read, Ry1–Ry256, Gy1–Gy256, By1–By256 are obtained. When the red pattern is read, Rr1–Rr256, Gr1–Gr256, Br1–Br256 are obtained. When the green pattern is read, Rg1–Rg256, Gg1–Gg256, Bg1–Bg256 are obtained. When the blue pattern is read, Rb1–Rb256, Gb1–Gb256 and Bb1–Bb256 are obtained.

The characteristics of the R, G, B filters of the reader are known. The CPU 27 executes a process on the basis of the known characteristics of the filters and the signals Rc1, Gc1 and Bc1 stored in the RAM 32 to determine a chromaticity L*abc1 when the first nozzle of the recording head prints the cyan pattern (L represents lightness, and ab represents the chromaticity). Similarly, the chromaticity L*abm1 when the first nozzle prints the magenta pattern is obtained from the signals Rm1, Gm1 and Bm1; L*aby1 is obtained from the signals Ry1, Gy1 and By1. After all, the determinations are made as to the chromaticities L*abc1, L*abm1, L*aby1, L*abr1, L*abg1 and L*abb1 when the first nozzle prints six color patterns, respectively (step 44).

On the other hand, ROM 101 in the CPU 27 stores the ideal chromaticities of the six color output pattern, they are L*abc0, L*abm0, L*aby0, L*abr0, L*abg0 and L*abb0.

The color difference E*abc1, for example, for the cyan pattern can be expressed as:

$$\Delta E * abc1 = \sqrt{(L*c1 - L*c0)^2 + (a*c1 - a*c0)^2 + (b*c1 - b*c0)^2}$$

Similarly, the color differences between the measured chromaticity of the test patterns and the ideal chromaticities are determined for the magenta color, yellow color, red color, green color and blue color. They are ΔE*abm1, ΔE*aby1, ΔE*abr1, ΔE*abg1, E*abb1 (step 45).

Then, the mean square root value of the color differences for the respective test patterns is obtained by the following:

$$\Delta E*ab1 = \sqrt{(\Delta E*abc1)^2 + (\Delta E*abm1)^2 + (\Delta E*aby1)^2 + (\Delta E*abr1)^2 + (\Delta E*abg1)^2 + (\Delta E*abb1)^2}$$

(Step 46)

Then, the C, M and Y signals are corrected so that the value ΔE*ab1 is at a minimum (step 47, FIG. 7).

More particularly, the change in L*ab when C, M and Y signals are slightly changed is empirically determined in the respective patches of the chromaticities, and resultants are stored in the form of polynomials or LUT. On the basis of these when the C, M and Y signals are changed by small amounts L*ab is calculated, and the basis of the calculated values, ΔE*ab1 is calculated. Then, the correction amounts for the C, M and Y signals providing the minimum value for ΔE*ab1 are determined. Then, selection signals for the correction curve in the non-uniformity correcting table is 15 determined in accordance with the correction amount (step 48). The above described processing is executed for the first nozzle through the 256th nozzle (step 49). Then, the selection signals for the correcting tables are determined for the respective nozzles. They are stored in the non-uniformity correcting RAMs 29a, 29b and 29c in FIG. 1 (step 50).

As described in the foregoing, the signals for the respective colors are corrected using the correction data described above, by which the chromaticity of each nozzle is corrected to be at the ideal level, and therefore, the non-uniformity can be corrected when the colors are mixed. In addition, the correction is made as an average for plural patterns, and therefore, the non-uniformity is not unexpectedly conspicuous in a particular color mixture pattern.

In this embodiment, the outputting and reading of the non-uniformity correcting pattern may be carried out by a service man or a user, or it is possible that the apparatus automatically performs corrections. In an apparatus wherein the original is read by CCD having three color filters, and an image is produced by a color printer, the original reader may be used as the reader described in the foregoing.

Another embodiment will be described.

In the first embodiment, the number of dots by each nozzle is corrected. In the second embodiment, however, the width of the driving pulse applied to each nozzle is corrected.

Figure 2:
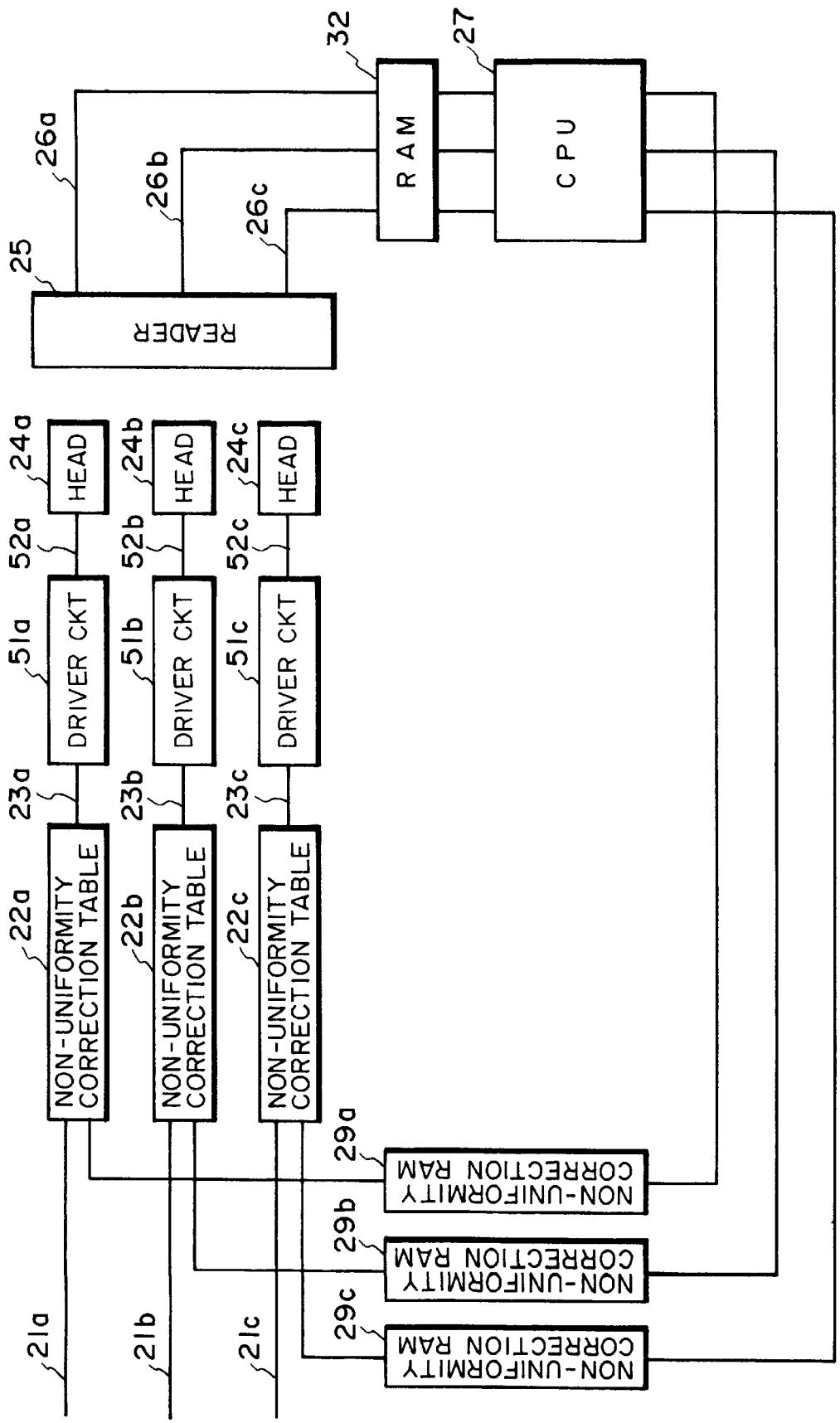
FIG. 2 is a block diagram illustrating second and third embodiments of the present invention.
Figure 3:
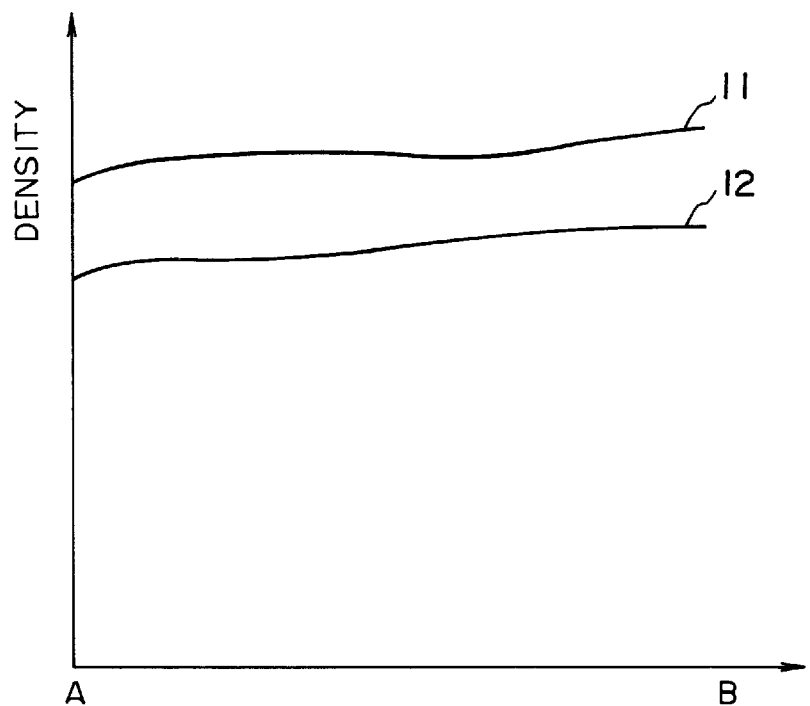
FIGS. 3 and 4 illustrate non-uniformity of a color mixed image.
Figure 4:
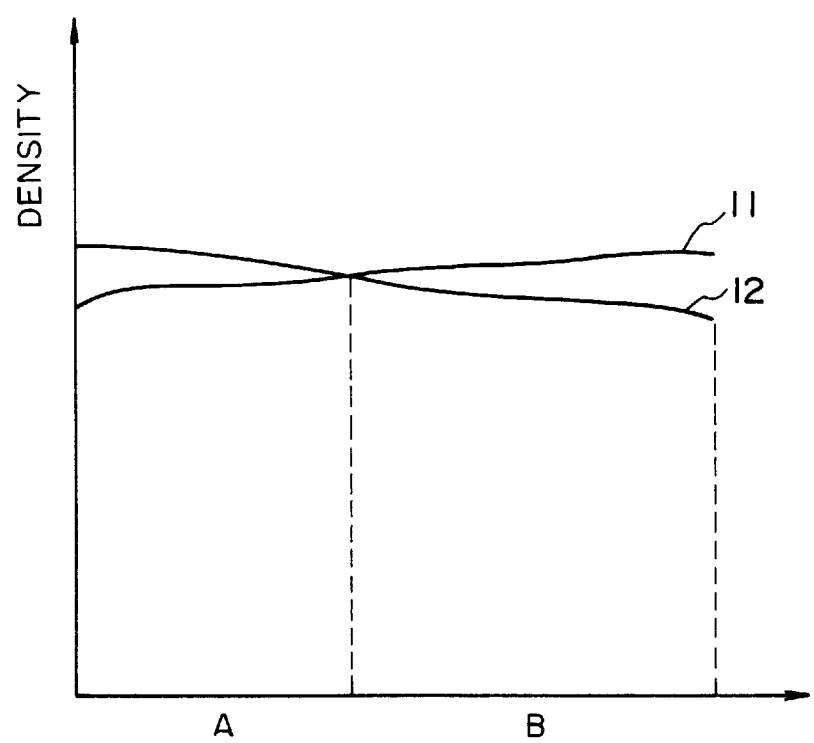

FIG. 2 shows a block diagram therefor, wherein the same reference numerals are assigned to the corresponding parts.

The corrected signals 23a, 23b and 23c are supplied to the driving circuits 51a, 51b and 51c. The driving circuits 51a, 51b and 51c produce driving pulse signals 52a, 52b and 52c having the pulse widths in accordance with the magnitudes of the signals 23a, 23b and 23c. By this, the multi-nozzle recording heads 24a, 24b and 24c are driven. The multi-nozzle heads are of piezoelectric type, in which the quantity of the ink ejected is changeable in accordance with the driving pulse width. Therefore, the non-uniformity can be corrected with the above-described structure.

A third embodiment of the present invention will be described, wherein the voltage of the pulse applied to each of the nozzles is corrected. In this embodiment, the driving circuits 51a, 51b and 51c control the driving voltages applied to the recording heads 24a, 24b and 24c. The voltages of the driving pulses 52a, 52b and 52c are controlled in accordance with the signals 23a, 23b and 23c, and the control signals are produced. The plural recording heads 24a, 24b and 24c are capable of controlling the quantity of ejected ink in accordance with the driving voltage, and therefore, the non-uniformity can be corrected in the structure described above.

In the foregoing embodiments, the chromaticity as determined by L*ab is used, but this is not limiting, and another chromaticity coordinate system, such as L*uv or the like is usable. The type of the multi-head may be a full-line head having a length equal to the image recording width, or a semi-multi-head wherein serial scanning is used.

The recording head is not limited to tan ink jet recording head, but it may be a thermal recording type head such as thermal transfer type. In the case of ink jet recording heads, it is not limited to the piezoelectric type such as that, but may be another type in which a bubble is produced by a heater in a nozzle to eject the ink from the nozzle.

The correction (test) pattern is not limited to six colors, but any desired colors and any desired number of patterns are usable.

The value E*ab1 which is to be minimized is not limited to the mean square root of the color difference in each of the test patterns, but may be a simple average or a weighted average giving weights to the respective test patterns.

As described in the foregoing, according to the present invention, in a color image recording apparatus or method using plural recording heads at least one of number of dot prints, a size of the dot or the density thereof for each picture element is corrected so that when a uniform pattern is printed, the chromaticities of the respective picture elements are substantially the same. Then, a uniform image can be provided even if the colors are mixed.

In addition, the correction is made such that the effects of the correction are on the average of different color uniform patterns, and therefore, the 25 non-uniformities for the respective colors are small on the average.

In this embodiment, the test pattern uses colors including red, green and blue (mixed colors) and yellow, magenta and cyan colors (single color pattern), and therefore, the density non-uniformity can be minimized for the full-color image. The color mixture may be between the similar colors, for example, dark and light similar color ink may be mixed.

According to the embodiment using the color mixture, the non-uniformity can be corrected with high accuracy.

While the invention has been described with reference to the structures disclosed herein, it is not confined to the details set forth and this application is intended to cover such modifications or changes as may come within the purposes of the improvements or the scope of the following claims.

What is claimed is:

1. A color image recording apparatus including a plurality of recording heads for effecting recording with different colors, said recording heads each having a plurality of nozzles, said color image recording apparatus effecting color recording on the basis of image data corresponding to respective colors, said apparatus comprising:

test pattern recording means for effecting recording, by said plurality of heads on a recording material, of a plurality of test patterns comprising a monochromatic test pattern and a test pattern provided by a color mixture by at least two of said recording heads;

detecting means for detecting a density non-uniformity in the recorded plurality of text patterns;

calculating means for calculating correction data for respective ones of the nozzles on the basis of detecting of the plurality of test patterns; and correction means for correcting the image data on the basis of the correction data provided by said calculating means.

2. An apparatus according to claim 1, wherein said recording elements are ink jet recording elements.

3. An apparatus according to claim 2, wherein said ink jet recording elements use thermal energy to produce a bubble to eject a recording ink.

4. An apparatus according to claim 1, wherein said detecting means further comprises a photoelectric transducer element for converting an optical density of the color image to an electric signal.

5. An apparatus according to claim 1, wherein said calculating means calculates the correction data so as to suppress density non-uniformity of the plurality of test patterns.

6. An apparatus according to claim 1, wherein the test pattern provided by the color mixture is made of at least two color materials of cyan, yellow and magenta.

7. An apparatus according to claim 1, wherein said calculating means calculates the correction data for each nozzle of the plurality of recording head on the basis of chromaticity at a position corresponding to each of the nozzles in the plurality of test patterns.

8. An apparatus according to claim 1, further comprising means for binarizing the image data corrected by the correction means.

* * * * *

UNITED STATES PATENT AND TRADEMARK OFFICE
CERTIFICATE OF CORRECTION

PATENT NO.    : 6,126,264
DATED         : October 3, 2000
INVENTOR(S)   : Akio Suzuki et al.

It is certified that error appears in the above-identified patent and that said Letters Patent is hereby corrected as shown below:

Title page,
Item [57], ABSTRACT,
Line 15, "of" should be deleted.

Item [56], References Cited,
FOREIGN PATENT DOCUMENTS,
"63-303370  4/1989  Japan" should read -- 64-303370  4/1989  Japan --; and please add the following:
-- 57-41965  2/1989  Japan
    1-41375  2/1989  Japan --.

Drawings,
Figure 7, Sheet 6, "CHARACTE  RISTICS" should read -- CHARACTERISTICS --.

Column 1,
Line 19, "is" should read -- are --.

Column 3,
Line 42, "(Y = 0.70X)," should read -- (Y = 0.70X) through --;
Line 43, "through" should be deleted;
Line 60, "the" (first occurrence) should be deleted; and
Line 66, "the" should be deleted.

Column 4,
Line 10, "pattern" should read -- patterns --;
Line 18, "a" should read -- the -- and "the" (first occurrence) should read -- a --; and
Line 52, "they" should read -- which --.

Column 5,
Line 20, "15" should be deleted.

Column 6,
Line 18, "tan" should read -- an --.

UNITED STATES PATENT AND TRADEMARK OFFICE
CERTIFICATE OF CORRECTION

PATENT NO.   : 6,126,264
DATED        : October 3, 2000
INVENTOR(S)  : Akio Suzuki et al.

It is certified that error appears in the above-identified patent and that said Letters Patent is hereby corrected as shown below:

<u>Column 7,</u>
Line 10, "elements" should read -- nozzles --; and
Line 12, "elements" should read -- nozzles --.

Signed and Sealed this

Twenty-fifth Day of June, 2002

Attest:

JAMES E. ROGAN
Attesting Officer    Director of the United States Patent and Trademark Office